W. J. HADDEN.

Clothes-Driers.

No. 133,530.

Patented Dec. 3, 1872.

Witnesses.

Inventor.

UNITED STATES PATENT OFFICE.

WILLIAM J. HADDEN, OF CLINTON, ILLINOIS.

IMPROVEMENT IN CLOTHES-DRIERS.

Specification forming part of Letters Patent No. 133,530, dated December 3, 1872.

*To all whom it may concern:*

Be it known that I, WM. J. HADDEN, of Clinton, in the county of De Witt and in the State of Illinois, have invented an Improved Clothes-Drier; and I do hereby declare that the following is a full, clear, and exact description thereof, reference being had to the annexed drawing making part of this specification, in which—

Figure 1:
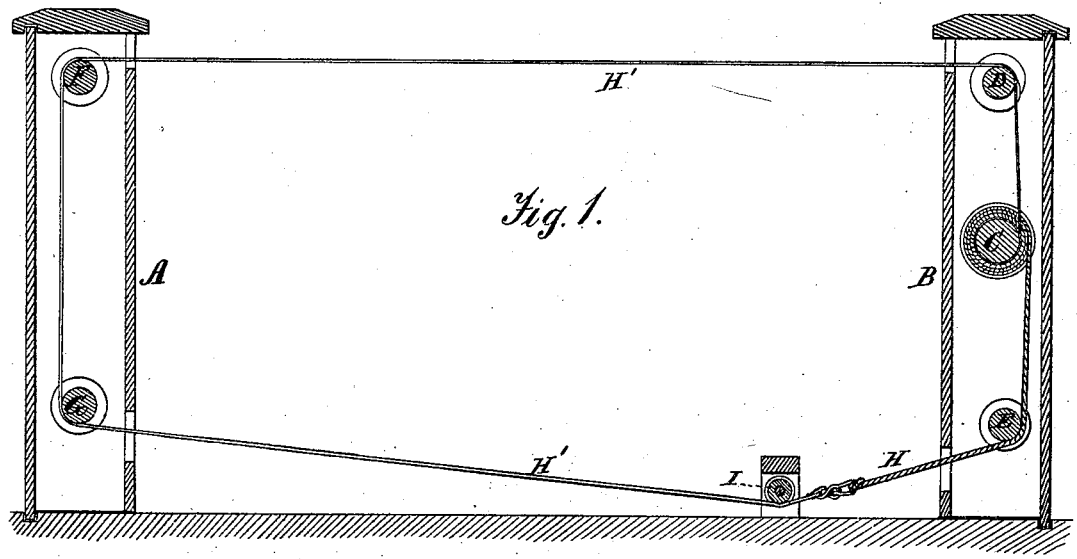
Figure 2:
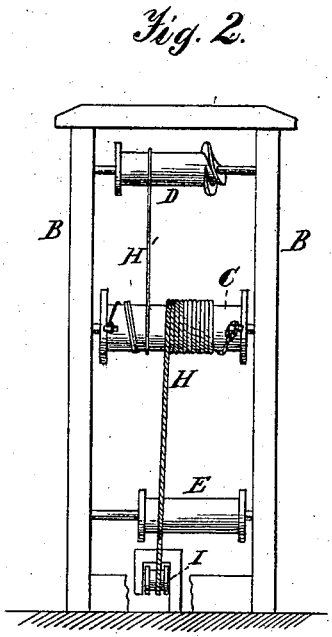

Figure 1 represents a sectional elevation of my improved manner of hanging and operating clothes-lines. Fig. 2 represents an end elevation.

The same letters of reference are used in both figures in the designation of identical parts.

The nature of my invention consists, first, in fastening the ends of a clothes-line to a drum and passing the line over suitable sheaves or pulleys in such a manner that the clothes may be hung upon the line, one article after another, without the necessity of moving along the line, the latter being run out as fast as filled with clothes. It consists, secondly, in the use of a line of rope in combination with a line of wire, so connected together and to the drum that the wire will be run out when the rope is wound upon the drum, and vice versa; the object being to save the rope from exposure when not in use.

To enable those skilled in the art to make and use my invention, I will proceed to describe its construction and operation.

The drum and sheaves or pulleys are mounted upon suitable posts, A and B, respectively, the distance between the two sets of posts being determined by the length of the line to be used for the suspension of the clothes. The drum C is hung between the posts B, at about mid-height thereof, and to it are attached the ends of the line, passing in opposite directions therefrom, respectively, over the pulleys D and E, above and below the drum; thence the line passes to the other posts A, reeving over the sheaves or pulleys F and G thereon.

The line must be made sufficiently long to take enough turns around the drum to equal in length the distance between the posts A and B at least. In this manner the clothes may be hung up and taken down from a point near either of the posts, the line being run out or drawn in.

The part H of the line upon which the clothes are to be hung is a rope, and the other part H' consists of wire, or some other material not easily affected by the weather.

When the line is not in use the rope H is wound upon the drum to save it from unnecessary exposure, the drum being suitably covered by a casing of the posts, in the manner shown.

The pulley I is located near either set of posts and some distance below the pulleys D and F, serving as a tightener, when the line has been burdened, by passing its lower portion under said pulley, as illustrated.

What I claim as my invention, and desire to secure by Letters Patent, is—

1. A clothes-line, moving over two pulleys and winding around the drum C, to which are attached the ends of the line, in combination with the tightening-pulley I, as and for the purpose set forth.

2. In combination with the above pulleys and drum and supporting-posts, a clothes-line and a metallic wire connected, and so arranged and operating that when the line is being wound upon the drum to prevent its exposure to the weather the wire will be unwound from the said drum and run out to take its place, as and for the purpose described.

WM. J. HADDEN.

Witnesses:
    P. T. SWEENEY,
    WM. W. ADAMS.